(No Model.)

W. W. ROBINSON.
HARROW.

No. 308,433. Patented Nov. 25, 1884.

WITNESSES:
Theo. G. Hoster
C. Sedgwick

INVENTOR:
W. W. Robinson
BY Munn & Co.
ATTORNEYS.

N. PETERS, Photo-Lithographer, Washington, D. C.

UNITED STATES PATENT OFFICE.

WILLIAM W. ROBINSON, OF ODEBOLT, IOWA.

HARROW.

SPECIFICATION forming part of Letters Patent No. 308,433, dated November 25, 1884.

Application filed June 27, 1884. (No model.)

*To all whom it may concern:*

Be it known that I, WILLIAM W. ROBINSON, of Odebolt, in the county of Sac and State of Iowa, have invented certain new and useful Improvements in Harrows, of which the following is a full, clear, and exact description.

This invention relates to harrows in which the teeth are carried by rocking beams under control of a lever to change the angular position of the teeth relatively to the ground; and it consists in a novel construction of the beams, and the means used to secure the teeth on the beams, also the means for carrying the beams and connecting them with the devices by which they are rocked, substantially as hereinafter described.

Reference is to be had to the accompanying drawings, forming part of this specification, in which similar letters of reference indicate corresponding parts in all the figures.

Figure 1:
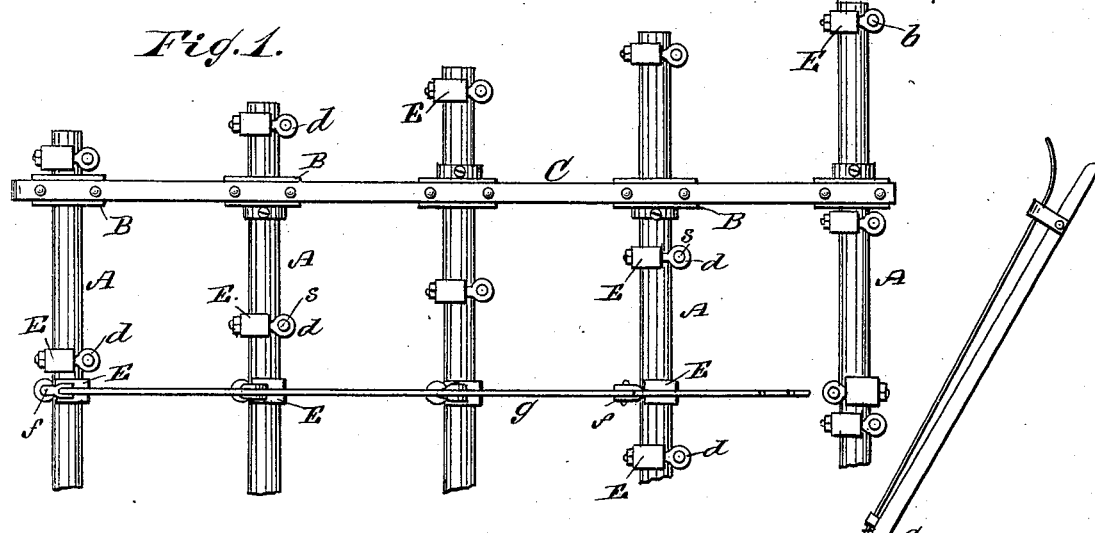
Figure 2:
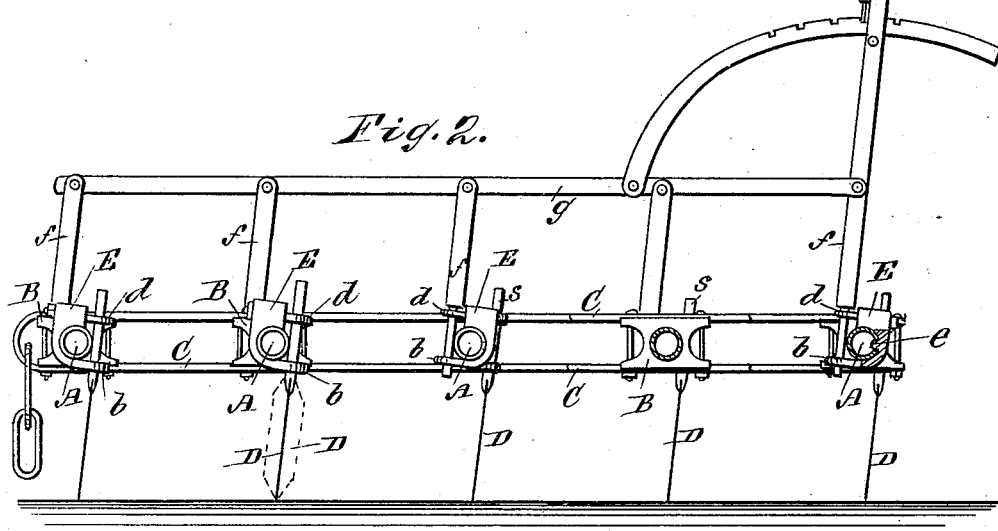
Figure 3:
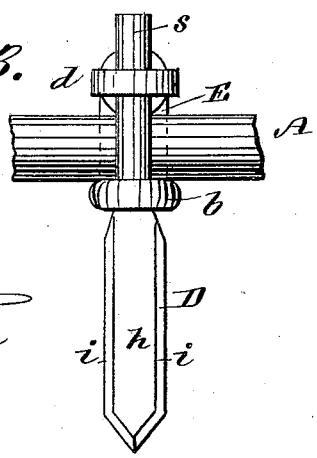

Figure 1 represents a top view of a portion of a harrow embodying my invention; Fig. 2, a partly sectional side view of the same; and Fig. 3, a rear view upon a larger scale of one of the harrow-teeth, with a portion of a piece of pipe forming one of the rocking beams, and a clip by which the tooth is secured to said pipe or beam.

A A are the rocking beams, of tubular construction, being composed of pieces of pipe, whereby lightness is combined with strength. Said pipes A A, of which there may be any number arranged one in rear of the other, are fitted to turn or work in boxes B B, bolted to their places at suitable distances apart within a doubled bar or strap support, C, on each side of the harrow. The teeth D are secured to these pipes in their rear by metal clips E, constructed and arranged to hug the pipes from their front sides, and having a backwardly-projecting under jaw, $b$, which forms a lower bearing for the shanks of the teeth, an eye-tightening bolt, $d$, passing through the upper end portion of the clip, and secured by a nut from the front side, forming the upper bearing for the tooth-shank. The tightening up of the bolts $d$ causes the clips E to firmly hold the teeth by their shanks up against the rear sides of the pipes A, and the clips E are locked or prevented from turning on the pipes by an inner teat or projection, $e$, on each clip, entering an indentation or perforation in the side of the pipe, as shown at the right hand of Fig. 2 for a clip having a reversed position on the pipe, but otherwise of the same construction, and which is used as a connecting means for rocking the pipe, each of the pipes A being provided with a similarly-arranged clip, E, in the center of its length for rods $f$ to enter down within the jaws and eyebolts of said clips, which rods are connected above with a bar, $g$, that is moved backward or forward by a lever, G, to rock or turn the several pipes for the purpose of varying the angular position of the teeth relatively to the ground, as required. The other reversely-arranged clips E, which carry the teeth instead of being in line with one another, as in case of the clips for rocking the pipes, are disposed and secured, as described, on the pipes in staggering relation with each other, to give the teeth their proper distribution over the harrow. The shanks $s$ of the teeth D are made of sufficient length to set the teeth up or down as required, and of rounded construction to permit of the teeth being turned in their clip-bearings when the clips are released for the purpose. The teeth themselves—that is, their bodies or working parts $h$—are of a flat construction, chamfered on their opposite edges, as at $i$ $i$, (see Fig. 3,) whereby said teeth, accordingly as they are turned or adjusted in their bearings in the clips, may be made to present either a broad flat working-surface or a knife-edge in front, or may be set to present an oblique working-face to suit different requirements of the soil or work to be done, and said teeth having opposite flat sides and opposite knife-edges, their working-surfaces or edges may be reversed or changed as required, whereby the durability of the teeth is increased. In Fig. 2 one of the teeth is shown by full lines as presenting a broad front working-surface, and by dotted lines as turned to present a knife-edge.

Having thus described my invention, what I claim as new, and desire to secure by Letters Patent, is—

1. The rocking beams composed of pipes A, in combination with the boxes B and strap supports C, the clips E, with their tightening-eyebolts $d$, the rods $f$, and the lever G, the whole being arranged to provide for the axial adjustment of said beams or pipes which carry the teeth of the harrow, essentially as shown and described.

2. In combination with the circular rocking beams or pipes A of the harrow, the clips E, fitted to hug and engage therewith, as described, and constructed with a lower perforated jaw, *b*, and upper tightening-eyebolt, *d*, substantially as and for the purpose or purposes specified.

3. The combination of the harrow-teeth D, having rounded shanks, the clips E, having a lower perforated jaw, *b*, and upper tightening-eyebolt, *d*, and the rocking beams or pipes A, substantially as specified.

WILLIAM W. ROBINSON.

Witnesses:
W. A. HELSELL,
FRANK W. BENNETT.